US011316854B2

(12) United States Patent
Vajravel et al.

(10) Patent No.: US 11,316,854 B2
(45) Date of Patent: Apr. 26, 2022

(54) REVERSE AUTHENTICATION IN A VIRTUAL DESKTOP INFRASTRUCTURE ENVIRONMENT

(71) Applicant: Dell Products L.P., Round Rock, TX (US)

(72) Inventors: Gokul Thiruchengode Vajravel, Bengaluru (IN); Ramanujam Kaniyar Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 359 days.

(21) Appl. No.: 16/267,221

(22) Filed: Feb. 4, 2019

(65) Prior Publication Data

US 2020/0252401 A1 Aug. 6, 2020

(51) Int. Cl.
*H04L 29/06* (2006.01)

(52) U.S. Cl.
CPC ........ *H04L 63/0884* (2013.01); *H04L 63/083* (2013.01); *H04L 63/0807* (2013.01); *H04L 63/0853* (2013.01); *H04L 63/0861* (2013.01)

(58) Field of Classification Search
CPC ............. H04L 63/0884; H04L 63/0807; H04L 63/083; H04L 63/0861; H04L 63/0853

USPC .................................................... 726/2
See application file for complete search history.

(56) References Cited

U.S. PATENT DOCUMENTS

| | | | |
|---|---|---|---|
| 2011/0315763 A1* | 12/2011 | Hochmuth | G06F 21/34 235/380 |
| 2018/0007059 A1* | 1/2018 | Innes | G06F 21/6218 |

* cited by examiner

*Primary Examiner* — Jeffrey C Pwu
*Assistant Examiner* — Nega Woldemariam
(74) *Attorney, Agent, or Firm* — Kirton McConkie; Brian Tucker (57) ABSTRACT

Reverse authentication can be performed in a VDI environment to enable an authentication device to gain access to a client without requiring that the authentication device's drivers be installed on the client. When an authentication device is connected to the client while the client is locked or not logged in, the authentication device can be redirected to a virtual appliance on which the authentication device's drivers are installed. The authentication device can then be used to authenticate the user via the virtual appliance. When authentication is successful, the virtual appliance can send the resulting authentication information back to the client to enable the user to be logged in to the client. Additionally, the virtual appliance can return the authentication device to the client. The client can then employ the authentication information to establish a remote session on a server and redirect the authentication device to the remote server.

20 Claims, 10 Drawing Sheets

REVERSE AUTHENTICATION IN A VIRTUAL DESKTOP INFRASTRUCTURE ENVIRONMENT

CROSS-REFERENCE TO RELATED APPLICATIONS

N/A

BACKGROUND

The present invention is generally directed to techniques for performing reverse authentication in a virtual desktop infrastructure (VDI) environment to thereby allow an authentication device to be employed at the client terminal without requiring the authentication device's driver(s) to be loaded on the client terminal. Some authentication devices (e.g., those that do not employ the chip card interface device (CCID) protocol) require vendor-specific drivers on the end user's computer. In a VDI environment where the end user's computer is typically a thin client, it may not be desirable to install the vendor-specific drivers (e.g., because there are limited resources), or it may not be possible to install the vendor-specific drivers (e.g., when the thin client is not a Windows-based thin client and the vendor only provides Windows-compatible drivers). For these reasons, many authentication devices cannot be used in a VDI environment.

Because the present invention employs USB device redirection, an overview of how this redirection is accomplished will be provided. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

Figure 1:
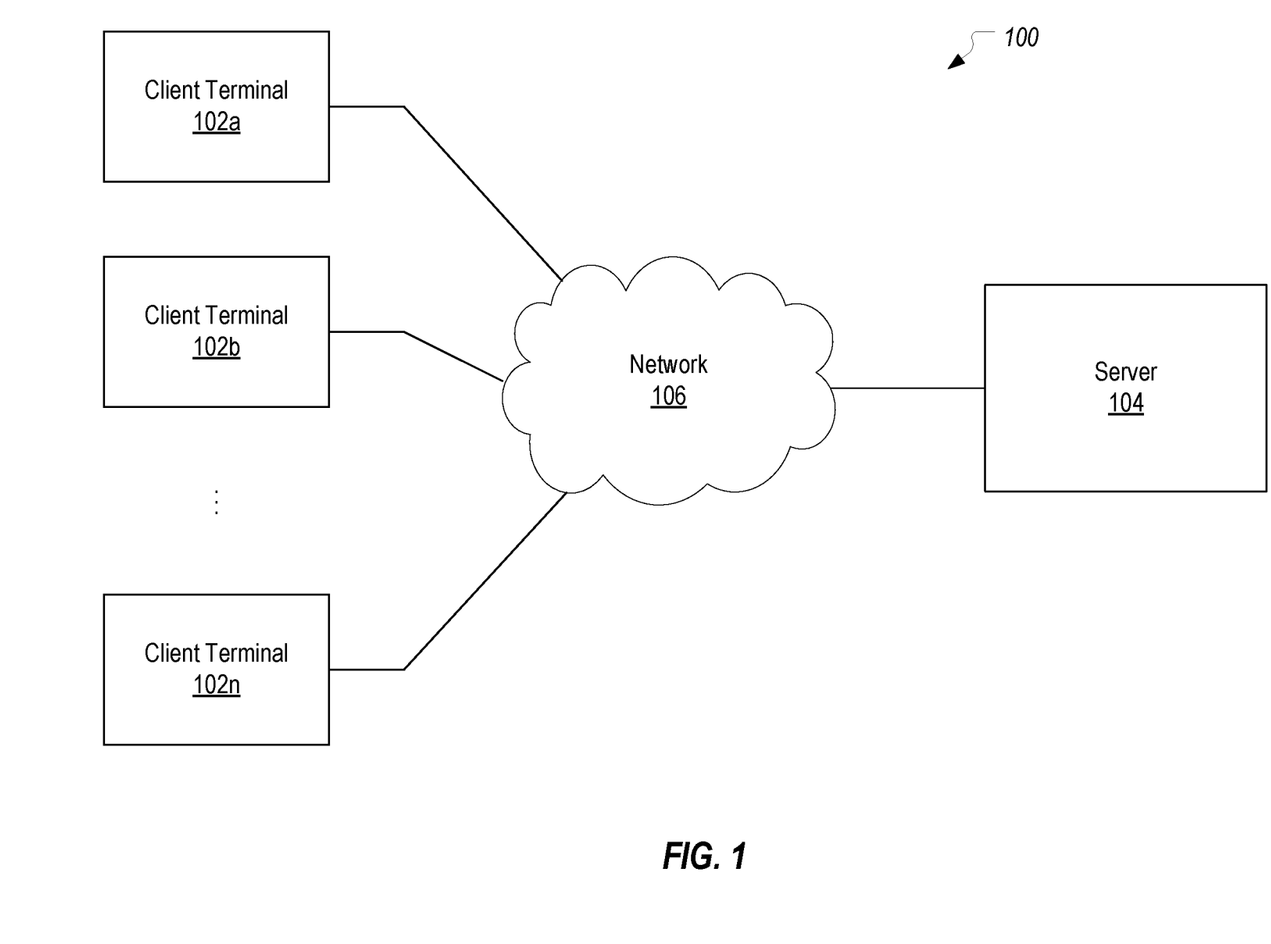
FIG. 1 illustrates an example computing environment in which the present invention can be implemented.
Figure 2:
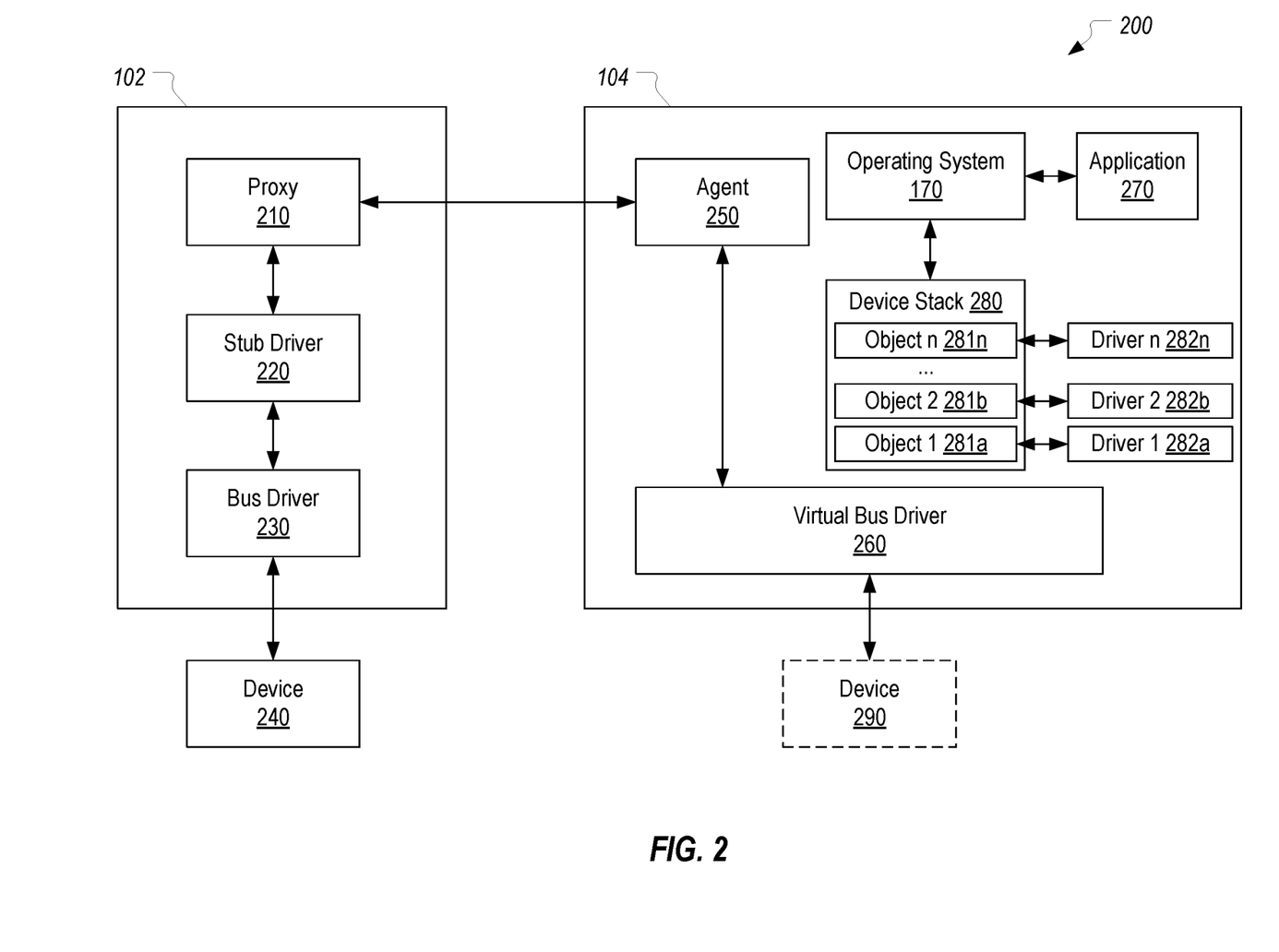
FIG. 2 illustrates a general architecture that may exist when a USB device is redirected from a client terminal to a server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment. For purposes of this application, device 240 can represent a biometric device such as a fingerprint scanner.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281*a*, 281*b*, . . . , 281*n*, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282*a*, 282*b*, . . . 282*n*, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281*a* stating that a new device has been plugged in. Next, a plug-and-play (PNP) component of the operating system will search for and load the best driver for device 240, which will create another device object 281*b* that is layered over the previous device object 281*a*. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

In a VDI environment, the user will typically be required to input credentials to log in to client 102 in order to then establish a remote session on server 104. Also, after a remote session has been established, if client 102 has been locked, the user will typically be required to again input the credentials to unlock client 102. In both cases, the credentials are employed locally to gain access to client 102. The problem arises when it is desired to use authentication devices to provide these credentials (which is a common requirement in the banking industry). As indicated above, some authentication devices require vendor-specific drivers to be installed on client 102. Therefore, if the vendor-specific drivers are not installed on client 102, these authentication devices cannot be used to provide credentials for gaining access to client 102.

BRIEF SUMMARY

The present invention extends to methods, systems, and computer program products for performing reverse authentication in a VDI environment. By performing reverse authentication, an authentication device can be used to gain access to a client without requiring that the authentication device's drivers be installed on the client. When an authentication device is connected to the client while the client is locked or not logged in, the authentication device can be redirected to a virtual appliance on which the authentication device's drivers are installed. The authentication device can then be used to authenticate the user via the virtual appliance. When authentication is successful, the virtual appliance can send the resulting authentication information back to the client to enable the user to be logged in to the client. Additionally, the virtual appliance can return the authentication device to the client. The client can then employ the authentication information to establish a remote session on a server and redirect the authentication device to the remote server.

In one embodiment, the present invention is implemented by a reverse authentication client that is executing on a client terminal in a virtual desktop infrastructure environment as a method for performing reverse authentication. The reverse authentication client receives user input while the client terminal is not logged in or is locked. In response to receiving the user input, the reverse authentication client redirects an authentication device that is connected to the client terminal to a virtual appliance. In conjunction with redirecting the authentication device to the virtual appliance, the reverse authentication client sends user input credentials which include the user input to a reverse authentication server executing on the virtual appliance to thereby enable authentication to be performed on the virtual appliance. The reverse authentication client receives authentication results from the reverse authentication server. In response to receiving the authentication results, the reverse authentication client logs in or unlocks the client terminal and ceases the redirection of the authentication device to the virtual appliance.

In another embodiment, the present invention is implemented on a virtual appliance as a method for performing reverse authentication in a virtual desktop infrastructure environment. User input credentials are received from a reverse authentication client executing on a client terminal. In conjunction with receiving the user input credentials, an authentication device that is connected to the client terminal is redirected to the virtual appliance to thereby enable the authentication device to be accessed on the virtual appliance. The received user input credentials are employed to cause an authentication subsystem on the virtual appliance to authenticate a user of the client terminal using the redirected authentication device. Authentication results are received from the authentication subsystem and sent to the reverse authentication client. The redirection of the authentication device is also ceased.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "authentication device" should be construed as encompassing smartcards/readers, biometric scanners, and any other type of input device that a user can employ to authenticate. The term "authentication information" should be construed as encompassing any information that may be employed to authenticate a user including, for example, a domain name, a username, a password, a PIN, a ticket (e.g., a Kerberos TGT), a hash (e.g., an NTLM hash), etc.

Figure 3:
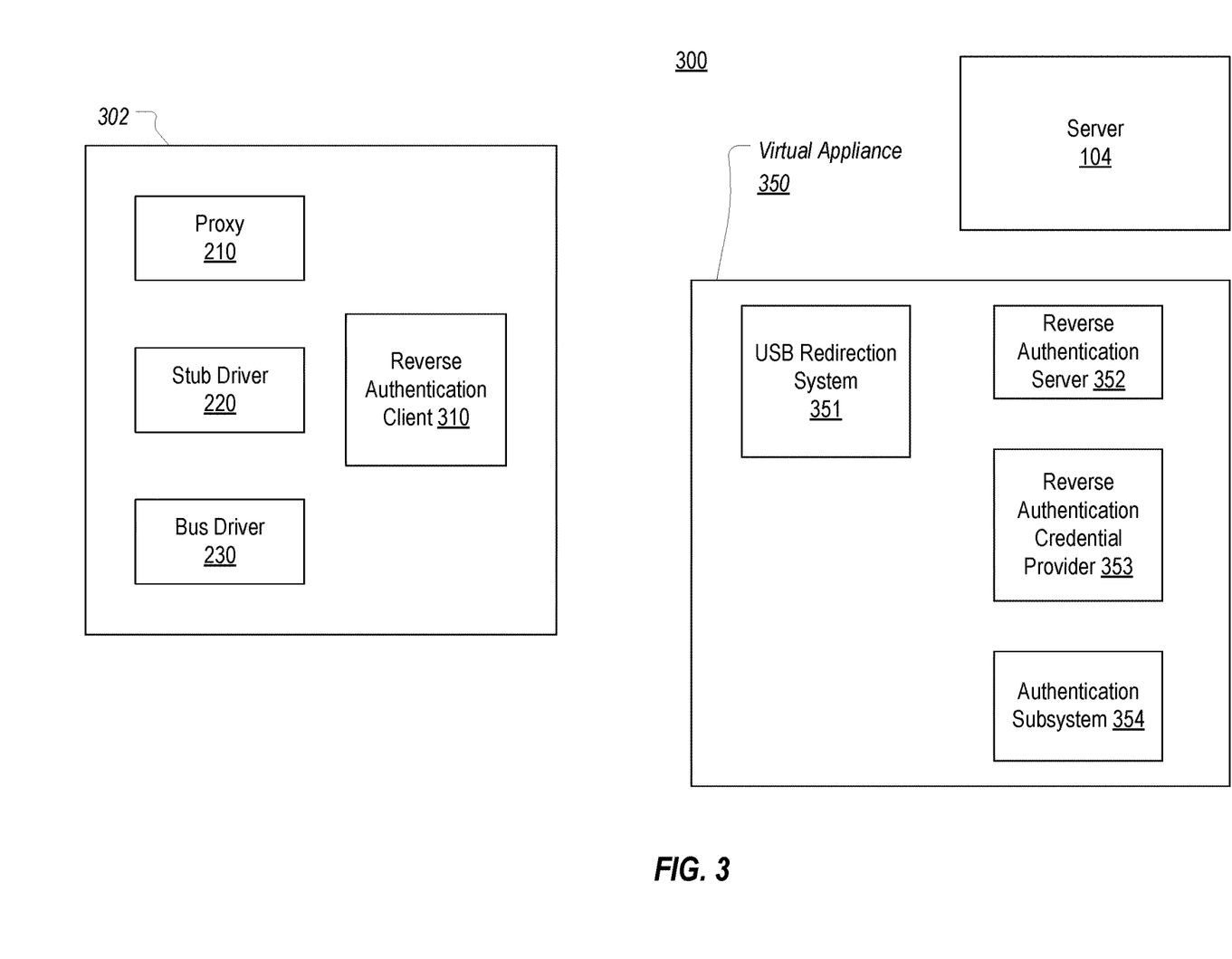
FIG. 3 illustrates an example VDI environment in which the present invention can be implemented.

FIG. 3 illustrates an example of a VDI environment 300 in which the present invention can be implemented. VDI environment 300 includes server 104 which can be configured as described in the background. Of primary relevance to the present invention, server 104 can be configured to enable client 302 to establish a remote session and to redirect USB devices, including authentication devices, for access within the remote session. Client 302 can be configured similar to client 102 so that USB devices connected to client 302 can be redirected. In accordance with embodiments of the present invention, client 302 can also include a reverse authentication client 310.

VDI environment 300 also includes a virtual appliance 350 which, in conjunction with client 302, implements the reverse authentication techniques of the present invention. Virtual appliance 350 includes a USB redirection system 351 which can include components similar to those shown on server 104 in FIG. 2. Of importance to the present invention, USB redirection system 351 allows authentication devices that are connected to client 302 to be redirected to virtual appliance 350.

Virtual appliance 350 also includes a reverse authentication server 352 which is the server-side counterpart to reverse authentication client 310. As will be explained fully below, reverse authentication client 310 and reverse authentication server 352 can communicate authentication information as part of the reverse authentication process.

Virtual appliance 350 further includes a reverse authentication credential provider 353 and an authentication subsystem 354. Authentication subsystem 354 generally represents the components of the operating system that are employed to access an authentication device. As those of skill in the art understand how these components are employed, a detailed description will not be provided. By way of example, authentication subsystem 354 may include the Windows Smart Card Architecture (e.g., the Smart Card Resource Manager service and WinSCard CryptoAPI) and/or the Windows Biometric Framework (e.g., the Windows Biometric Service, Windows Biometric Driver Interface and Window Biometric Framework API). Of importance is the fact that authentication subsystem 354 enables a redirected authentication device to be accessed on virtual appliance 350. It is also noted that authentication subsystem 354 does not exist (or at least does not need to exist) on client 302.

Reverse authentication credential provider 353 can represent a "credential provider" as that term is used in the context of the Windows operating system or similar components in other operating systems. In general terms, a credential provider is a component that interacts with the user interface components to receive credentials from the user and then serialize them for submission to authentication subsystem 354. Reverse authentication credential provider 353 can preferably represent a custom credential provider that is specifically configured to perform the techniques described below.

FIGS. 4A-4F illustrate how reverse authentication can be implemented in VDI environment 300. For purposes of this example, it will be assumed that client 302 is initially turned off and that the user has booted client 302 while authentication device 440, which is assumed to be a smart card, is connected to client 302. As part of booting, the operating system on client 302 can present the user with a login screen. Of course, a login screen could equally be presented when client 302 is locked.

Figure 4A:
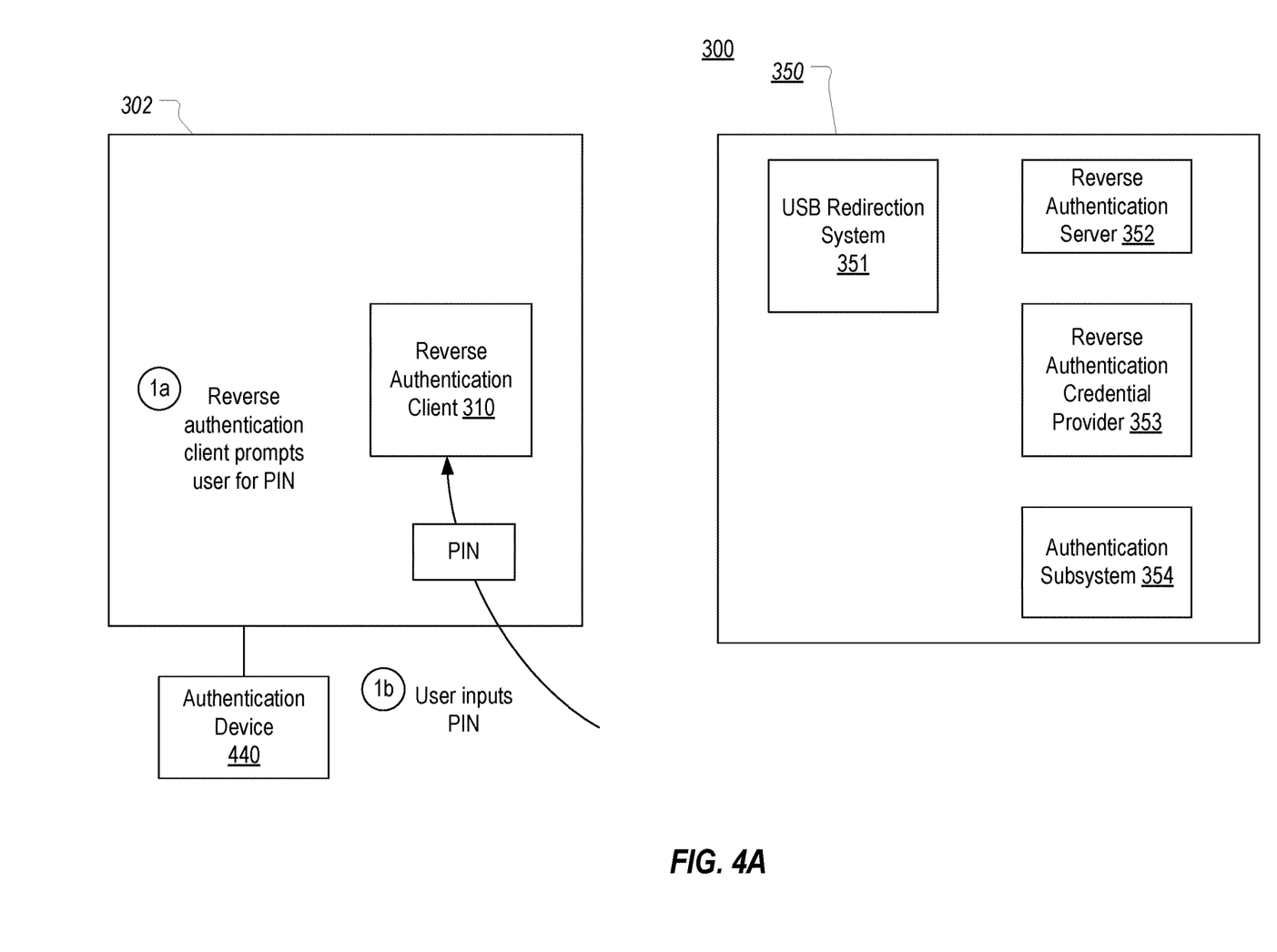
FIGS. 4A-4F illustrate how reverse authentication can be performed in the VDI environment.

As is represented in step 1a in FIG. 4A, when authentication device 440 is connected to client 302, reverse authentication client 310 can be configured to cause this login screen to present a request for the user's PIN associated with authentication device 440 (or another type of user input used for authentication). From the user perspective, this prompt for the PIN can be much the same as any typical smart card login screen. It is assumed that client 302 already knows the domain name and username for this user, and therefore does not need to prompt the user for this information. However, if the domain name and username are not yet known, client 302 can also prompt the user for this information. Hereinafter, the domain name, username and PIN (or other information that the user directly inputs to authenticate) will be referred to as "user input credentials." In step 1b, it is then assumed that the user provides his or her PIN.

Prior to proceeding, and to assist with an understanding of some of the benefits of the present invention, it is noted that, although client 302 is configured to prompt the user for the PIN for authentication device 440, client 302 likely will not include the authentication subsystem necessary to authenticate the user via authentication device 440. Stated another way, if client 302 were a typical Windows desktop, it would likely include the authentication subsystem and any vendor-specific drivers necessary to authenticate the user in a typical fashion. In contrast, when client 302 does not run Windows or has limited resources, the authentication subsystem and/or the vendor-specific drivers may not be available. To address such scenarios, reverse authentication client 310 and virtual appliance 350 can be used as follows.

Figure 4B:
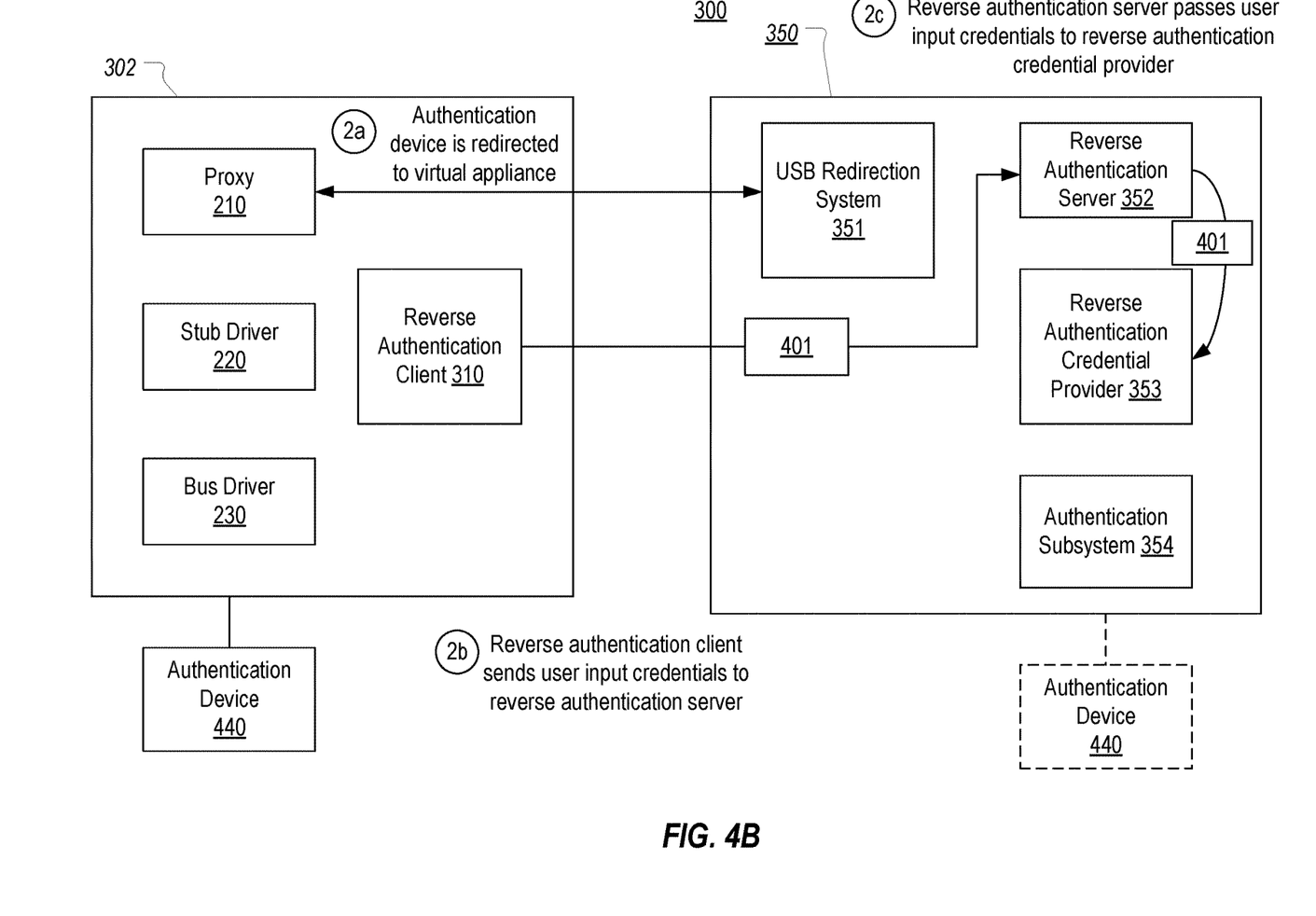

Turning to FIG. 4B, in response to the user entering a PIN, in step 2a, reverse authentication client 310 can cause authentication device 440 to be redirected to virtual appliance 350. This redirection can be performed in the manner described in the background so that authentication device 440 will appear on virtual appliance 350 as if it had been connected directly to virtual appliance 350. Importantly, this redirection will allow reverse authentication credential provider 353 and authentication subsystem 354 to access authentication device 440. Additionally, as part of this redirection, USB redirection subsystem 351 can provide the reader name and container name of authentication device 440 to reverse authentication server 352.

In step 2b, reverse authentication client 310 can also send the user input credentials 401 to reverse authentication server 352. As mentioned above, in embodiments where authentication device 440 is a smart card, the user input credentials will typically be in the form of a domain name, username and PIN. Preferably, reverse authentication client 310 and reverse authentication server 352 can establish a TLS/SSL secure channel for this communication to prevent the user input credentials 401 from being discovered. Next, in step 2c, reverse authentication server 352 can pass the user input credentials 401 to reverse authentication credential provider 353.

At this point, authentication device 440, due to the redirection, will be accessible to reverse authentication credential provider 353, and reverse authentication credential provider 353 will have the user input credentials 401 associated with authentication device 440 and will know the reader name and container name of authentication device 440. Reverse authentication credential provider 353 will therefore be able to request authentication of the user via authentication subsystem 354.

Figure 4C:
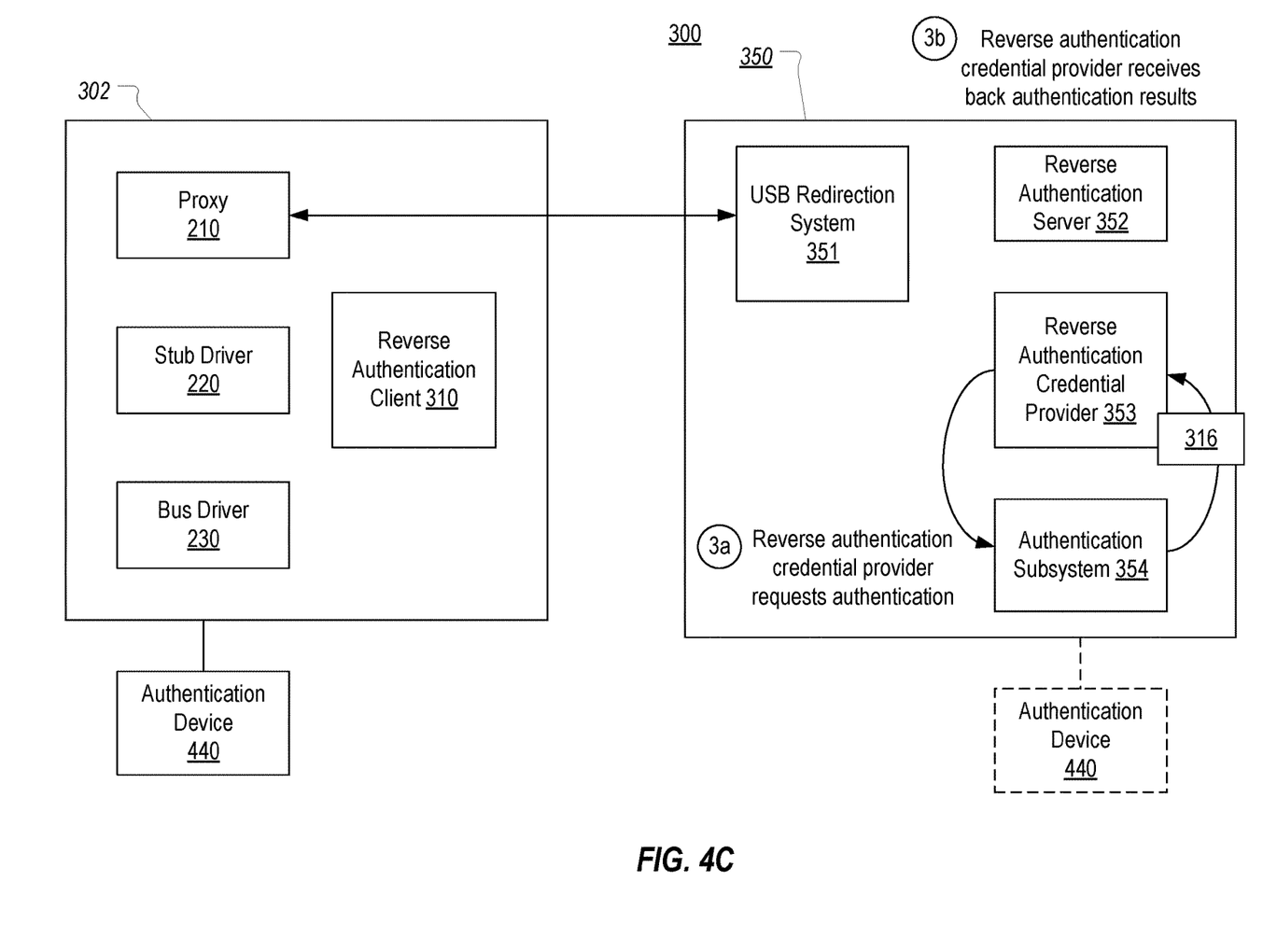

Accordingly, in step 3a shown in FIG. 4C, reverse authentication credential provider 353 can request authentication. Given that authentication device 440 is assumed to be a smart card, step 3a can include creating an appropriate structure for containing the authentication information such as a KERB CERTIFICATE LOGON structure that specifies the domain name, username, PIN, and the credential service provider (CSP) information (e.g., the reader name and container name for authentication device 440, etc. Step 3a can also include invoking the LsaLogonUser function to cause authentication subsystem 354 to perform the authentication using the supplied authentication information.

Assuming authentication is successful, in step 3b, authentication subsystem 354 will return authentication results 316 which will include, among other things, a ticket-granting ticket (TGT). Notably, this TGT can be used by client 302 to verify that the user has authenticated. Reverse authentication credential provider 353 can also query authentication subsystem 354 to obtain the NTLM hash for the user (e.g., by calling QueryContextAttributes).

Figure 4D:
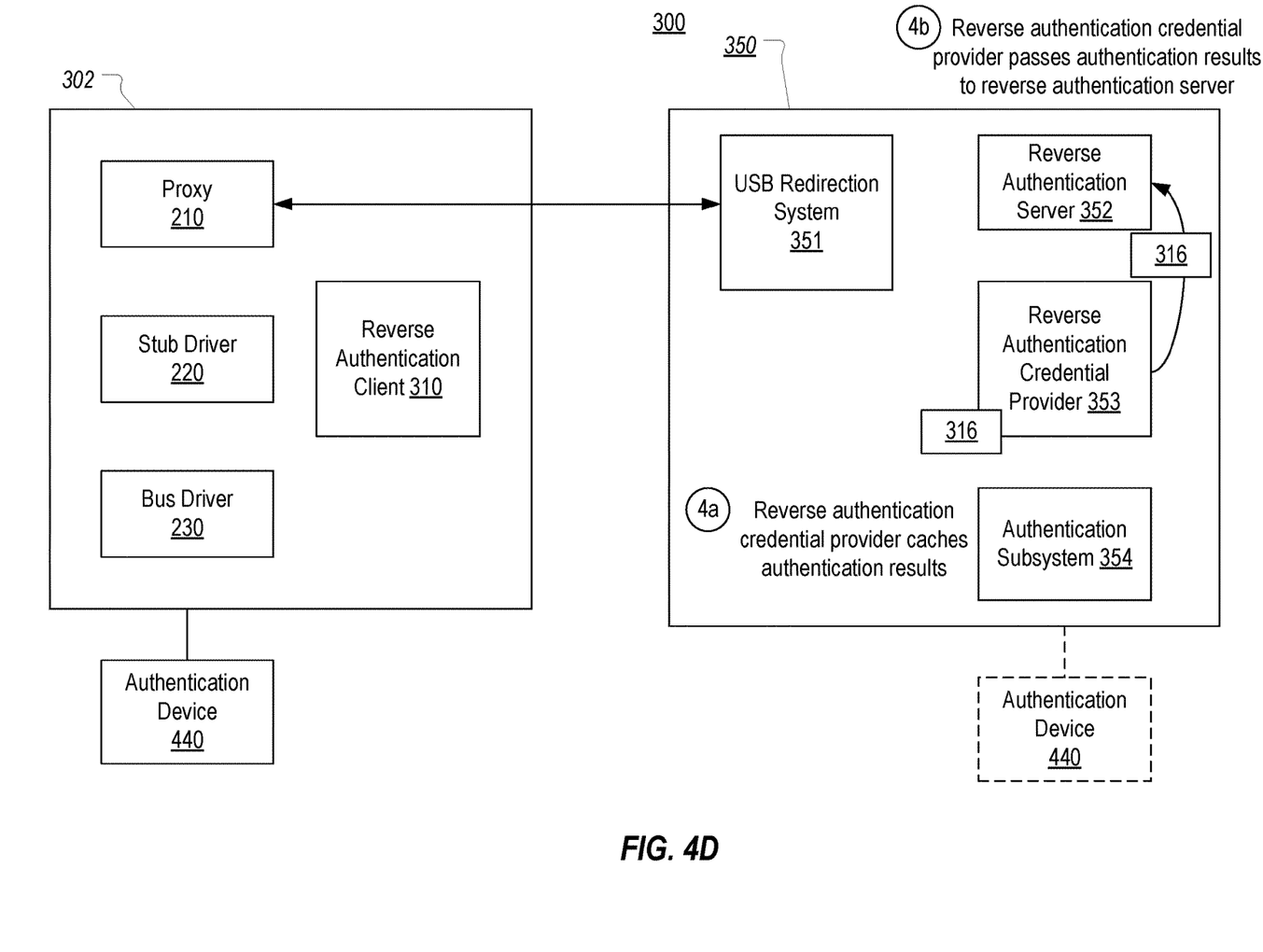

Turning to FIG. 4D, in step 4a, reverse authentication credential provider 353 can cache the authentication results 316 (e.g., the NTLM hash, TGT, PIN and CSP information) for subsequent use. In step 4b, reverse authentication credential provider 353 can also send the authentication results 316 (or possibly a subset of the authentication results) to reverse authentication server 352.

Figure 4E:
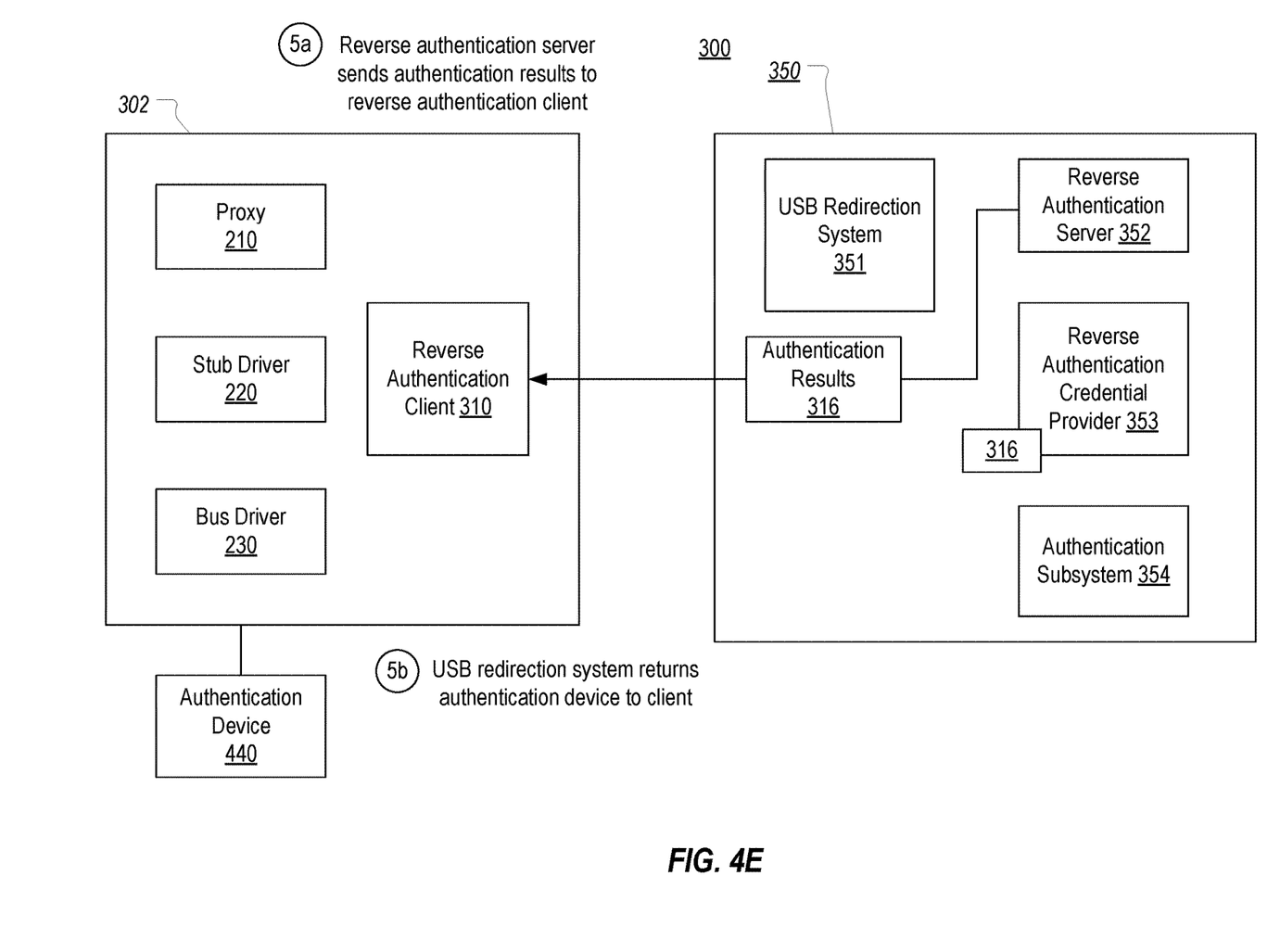
Figure 4F:
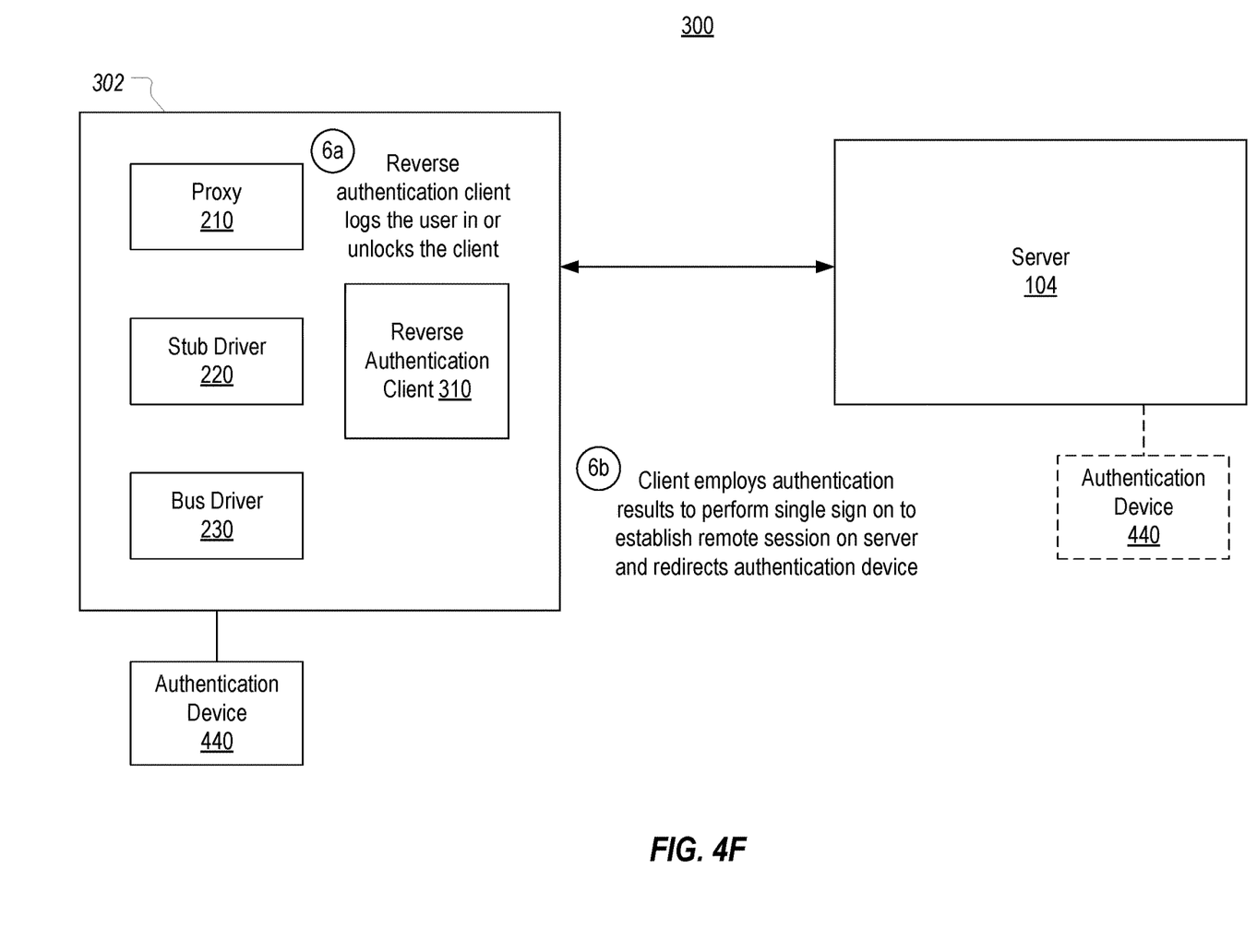

In step 5a shown in FIG. 4E, reverse authentication server 352 can send authentication results 316 to reverse authentication client 310. Preferably, the authentication results 316 that are returned include the TGT, the NTLM hash, the username, PIN, CSP information, etc.; however, in some embodiments, only the TGT can be provided. Additionally, in step 5b, reverse authentication server 352 can cause USB redirection system 351 to return authentication device 440 to client 302 (i.e., to cease redirection). At this point, authentication device 440 will be connected locally to client 302, and reverse authentication client 310 will have all the authentication results necessary to perform single sign-on.

Finally, in step 6a shown in FIG. 4E, reverse authentication client 310 logs the user in to client 302 or unlocks client 302 in response to receiving authentication results 316. Additionally, in step 6b, reverse authentication client 310 (or a remote desktop client of which reverse authentication client 310 is a part) can employ the authentication results 316 received from virtual appliance 350 to establish a remote session on server 104. Because virtual appliance 350 has already authenticated the user and provided reverse authentication client 310 with the TGT and/or the NTLM hash, client 302 can automatically create this remote session using single sign-on techniques such that the user will not need to again provide credentials. Additionally, because virtual appliance 350 returned authentication device 440 to client 302, authentication device 440 can be redirected to server 104 so that it can be accessed within the user's remote session.

To summarize, the present invention allows a client that does not have the authentication subsystem to still employ an authentication device to authenticate a user as part of logging in to or unlocking the client. By providing a virtual appliance and temporarily redirecting authentication devices to this virtual appliance, the present invention allows many such clients to perform authentication in this manner. The present invention therefore minimizes the resources on the client without sacrificing functionality.

Figure 5:
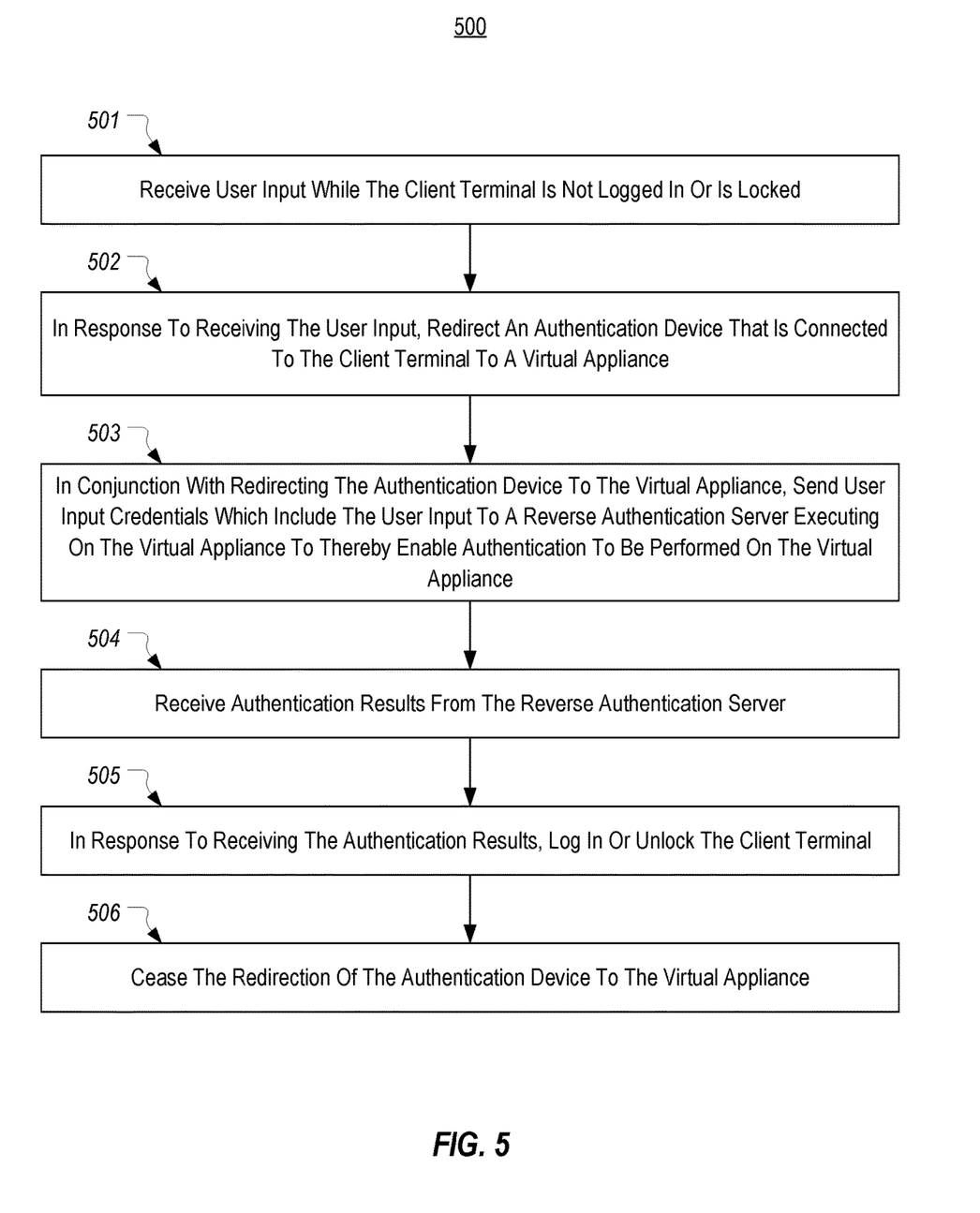
FIG. 5 provides a flowchart of an example method for performing reverse authentication.

FIG. 5 provides a flowchart of an example method 500 for performing reverse authentication. As an example, method 500 can be implemented by reverse authentication client 310 in VDI environment 300.

Method 500 includes an act 501 of receiving user input while the client terminal is not logged in or is locked. For example, reverse authentication client 310 can receive the user's PIN when authentication device 440 comprises a smart card or may receive a password when authentication device 440 is a biometric reader. Reverse authentication client 310 may also receive a domain name, username or other input from the user.

Method 500 includes an act 502 of, in response to receiving the user input, redirecting an authentication device that is connected to the client terminal to a virtual appliance. For example, reverse authentication client 310 can instruct proxy 210 to redirect authentication device 440 to virtual appliance 350 via USB redirection system 351.

Method 500 includes an act 503 of, in conjunction with redirecting the authentication device to the virtual appliance, sending user input credentials which include the user input to a reverse authentication server executing on the virtual appliance to thereby enable authentication to be performed on the virtual appliance. For example, reverse authentication client 310 can send user input credentials 401 to reverse authentication server 352.

Method 500 includes an act 504 of receiving authentication results from the reverse authentication server. For example, reverse authentication client 310 can receive authentication results 316 from reverse authentication server 352.

Method 500 includes an act 505 of, in response to receiving the authentication results, logging in or unlocking the client terminal. For example, reverse authentication client 310 can cause client 302 to be logged in or unlocked.

Method 500 includes an act 506 of ceasing the redirection of the authentication device to the virtual appliance. For example, proxy 210 can cease redirecting authentication device 440 to virtual appliance 350.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a reverse authentication client that is executing on a client terminal in a virtual desktop infrastructure environment that also includes a virtual appliance and a server, for performing reverse authentication, the method comprising:
    receiving, by the reverse authentication client that is executing on the client terminal, user input while the client terminal is not logged in or is locked;
    in response to receiving the user input and while the client terminal is not logged in or is locked, redirecting, by the reverse authentication client that is executing on the client terminal, an authentication device that is connected to the client terminal to the virtual appliance;
    in conjunction with redirecting the authentication device to the virtual appliance and while the client terminal is not logged in or is locked, sending, by the reverse authentication client that is executing on the client terminal, user input credentials which include the user input to a reverse authentication server executing on the virtual appliance to thereby enable authentication to be performed on the virtual appliance;
    while the client terminal is not logged in or is locked, receiving, by the reverse authentication client that is executing on the client terminal, authentication results from the reverse authentication server executing on the virtual appliance;
    in response to receiving the authentication results from the reverse authentication server executing on the virtual appliance, logging in or unlocking, by the reverse authentication client that is executing on the client terminal, the client terminal;
    in response to receiving the authentication results from the reverse authentication server executing on the virtual appliance, ceasing, by the reverse authentication client that is executing on the client terminal, the redirection of the authentication device to the virtual appliance;
    employing, by the reverse authentication client that is executing on the client terminal, the authentication results received from the reverse authentication server executing on the virtual appliance to establish a remote session on the server; and
    redirecting, by the reverse authentication client that is executing on the client terminal, the authentication device to the server to enable the authentication device to be accessed within the remote session.

2. The method of claim 1, wherein the authentication device comprises a smart card.

3. The method of claim 2, wherein the user input comprises a PIN.

4. The method of claim 3, wherein the user input credentials comprise a domain name, a username and the PIN.

5. The method of claim 1, wherein the authentication results include a ticket granting ticket, and wherein employing the authentication results to establish the remote session on the server comprises employing the ticket granting ticket to perform single sign-on.

6. The method of claim 1, wherein the authentication device comprises a smart card and the authentication results include one of more of:
    a Kerberos ticket;
    an NTLM hash;
    a username;
    a PIN; or
    a container name and reader name of the smart card.

7. The method of claim 1, wherein the authentication device is a biometric reader.

8. One or more non-transitory computer storage media storing computer executable instructions which when executed on a client terminal in a virtual desktop infrastructure environment that also includes a virtual appliance and a server implement a reverse authentication client that is configured to implement a method for performing reverse authentication, the method comprising:
    receiving, by the reverse authentication client that is executing on the client terminal, user input while the client terminal is not logged in or is locked;
    in response to receiving the user input and while the client terminal is not logged in or is locked, redirecting, by the reverse authentication client that is executing on the client terminal, an authentication device that is connected to the client terminal to the virtual appliance;
    in conjunction with redirecting the authentication device to the virtual appliance and while the client terminal is not logged in or is locked, sending, by the reverse authentication client that is executing on the client terminal, user input credentials which include the user input to a reverse authentication server executing on the virtual appliance to thereby enable authentication to be performed on the virtual appliance;
    while the client terminal is not logged in or is locked, receiving, by the reverse authentication client that is executing on the client terminal, authentication results from the reverse authentication server executing on the virtual appliance;
    in response to receiving the authentication results from the reverse authentication server executing on the virtual appliance, logging in or unlocking, by the reverse authentication client that is executing on the client terminal, the client terminal;
    in response to receiving the authentication results from the reverse authentication server executing on the virtual appliance, ceasing, by the reverse authentication client that is executing on the client terminal, the redirection of the authentication device to the virtual appliance;
    employing, by the reverse authentication client that is executing on the client terminal, the authentication results received from the reverse authentication server executing on the virtual appliance to establish a remote session on the server; and
    redirecting, by the reverse authentication client that is executing on the client terminal, the authentication device to the server to enable the authentication device to be accessed within the remote session.

9. The non-transitory computer storage media of claim 8, wherein the authentication device comprises a smart card.

10. The non-transitory computer storage media of claim 9, wherein the user input comprises a PIN.

11. The non-transitory computer storage media of claim 10, wherein the user input credentials comprise a domain name, a username and the PIN.

12. The non-transitory computer storage media of claim 8, wherein the authentication results include a ticket granting ticket, and wherein employing the authentication results to establish the remote session on the server comprises employing the ticket granting ticket to perform single sign-on.

13. The non-transitory computer storage media of claim 8, wherein the authentication device comprises a smart card and the authentication results include one of more of:
    a Kerberos ticket;
    an NTLM hash;
    a username; a PIN; or
    a container name and reader name of the smart card.

14. The non-transitory computer storage media of claim 8, wherein the authentication device is a biometric reader.

15. A method, implemented in a virtual desktop infrastructure environment that includes a client terminal, a virtual appliance, and a server, for performing reverse authentication, the method comprising:
    receiving, by a reverse authentication client that is executing on the client terminal, user input while the client terminal is not logged in or is locked;
    in response to receiving the user input and while the client terminal is not logged in or is locked, redirecting, by the reverse authentication client that is executing on the client terminal, an authentication device that is connected to the client terminal to the virtual appliance;
    in conjunction with redirecting the authentication device to the virtual appliance and while the client terminal is not logged in or is locked, sending, by the reverse authentication client that is executing on the client terminal, user input credentials which include the user input to a reverse authentication server executing on the virtual appliance;
    while the client terminal is not logged in or is locked, employing, by the reverse authentication server executing on the virtual appliance, the received user input credentials to cause an authentication subsystem on the virtual appliance to authenticate a user of the client terminal using the redirected authentication device;
    while the client terminal is not logged in or is locked, receiving, by the reverse authentication server executing on the virtual appliance, authentication results from the authentication subsystem;
    while the client terminal is not logged in or is locked, sending, by the reverse authentication server executing on the virtual appliance, the authentication results to the reverse authentication client;
    in response to receiving the authentication results from the reverse authentication server executing on the virtual appliance, logging in or unlocking, by the reverse authentication client that is executing on the client terminal, the client terminal;
    in response to receiving the authentication results from the reverse authentication server executing on the virtual appliance, ceasing, by the reverse authentication client that is executing on the client terminal, the redirection of the authentication device to the virtual appliance;
    employing, by the reverse authentication client that is executing on the client terminal, the authentication results received from the reverse authentication server executing on the virtual appliance to establish a remote session on the server; and
    redirecting, by the reverse authentication client that is executing on the client terminal, the authentication device to the server to enable the authentication device to be accessed within the remote session.

16. The method of claim 15, wherein the authentication device comprises a smart card.

17. The method of claim 16, wherein the user input credentials comprise a domain name, a username and a PIN.

18. The method of claim 15, wherein the authentication results sent to the reverse authentication client include a ticket granting ticket.

19. The method of claim 18, wherein the authentication results sent to the reverse authentication client also include an NTLM hash.

20. The method of claim 15, further comprising:
    caching the authentication results on the virtual appliance.

* * * * *